United States Patent
Nonaka et al.

(10) Patent No.: US 7,668,391 B2
(45) Date of Patent: Feb. 23, 2010

(54) IMAGE SIGNAL PROCESSOR AND IMAGE SIGNAL PROCESSING METHOD

(75) Inventors: Yuichi Nonaka, Yokohama (JP); Akihito Nishizawa, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 704 days.

(21) Appl. No.: 11/367,389

(22) Filed: Mar. 6, 2006

(65) Prior Publication Data
US 2007/0047832 A1    Mar. 1, 2007

(30) Foreign Application Priority Data
Aug. 26, 2005    (JP)    ............... 2005-245238

(51) Int. Cl.
*G06K 9/40*    (2006.01)
(52) U.S. Cl. .................. 382/260; 382/263; 382/264; 382/266
(58) Field of Classification Search ................ 382/254, 382/260, 263, 264, 266
See application file for complete search history.

(56) References Cited

U.S. PATENT DOCUMENTS

| 6,172,718 | B1* | 1/2001 | Alvarez et al. | ............... 348/625 |
| 2003/0210829 | A1* | 11/2003 | Someya et al. | ............... 382/263 |
| 2004/0207758 | A1 | 10/2004 | Sai et al. | |
| 2005/0140829 | A1* | 6/2005 | Uchida et al. | ............... 348/625 |
| 2006/0013479 | A1* | 1/2006 | Trimeche et al. | ............ 382/167 |

FOREIGN PATENT DOCUMENTS

| JP | 01-262158 | 10/1989 |
| JP | 10-113680 | 5/1998 |
| JP | 2004-208038 | 7/2004 |
| JP | 2005-269408 | 9/2005 |
| KR | 20-0203427 | 9/2000 |
| KR | 10-2004-0058006 | 7/2004 |

* cited by examiner

*Primary Examiner*—Andrew W Johns
*Assistant Examiner*—Gregory F Cunningham
(74) *Attorney, Agent, or Firm*—Antonelli, Terry, Stout & Kraus, LLP.

(57) ABSTRACT

The disclosed is to provide an image signal processor and its method in which the enhancement of resolution and the effective reduction of noise are compatible. The image signal processor is provided with an edge character detector that detects a character of an edge of an object, an image signal frequency zone limiter that executes a noise removing process, an image signal frequency zone enhancer that executes a resolution enhancing process and a gain controller that changes each intensity of the image signal frequency zone limiter and the image signal frequency zone enhancer according to an output result of the edge character detector.

6 Claims, 7 Drawing Sheets

IMAGE SIGNAL PROCESSOR AND IMAGE SIGNAL PROCESSING METHOD

BACKGROUND OF THE INVENTION

1. Field of the Invention

The present invention relates to an image signal processor and an image signal processing method.

2. Description of the Related Art

For the art related to this technical field, for example, there are JP No. 113680/1998, JP No. 262158/1989 and JP-A No. 208038/2004.

SUMMARY OF THE INVENTION

Heretofore, signal processing for enhancing the resolution of an image has been realized by increasing the gain of a high-frequency signal using differential information with peripheral pixels. However, noise by an analog circuit such as an image sensor is superimposed on a genuine image signal of a subject photographed by a camera. Therefore, the signal processing for enhancing the resolution of an image consequently amplifies a noise component.

For example, FIGS. 7A to 7C show an example described in the Patent Reference 1 when an extrapolated interpolated signal is generated. FIG. 7A shows input pixel signals and shows that noise of a noise amount Ns is superimposed on c and d of central pixels a to f. In the case of linear interpolation, when an interpolated signal is generated between each pixel, its noise amount is Ns and is similar to that of the input pixel signals as shown in FIG. 7B. However, in the case of extrapolated interpolation, as shown in FIG. 7C, its noise amount is $(1+\alpha)$ Ns and its S/N is deteriorated. As described above, conventional type signal processing for enhancing the resolution of an image mainly caused the amplification of noise.

For example, in an interpolated signal generating method described in the Patent Reference 2, a coefficient is determined based upon the correlation of signals and an interpolated signal is generated. For example, when an interpolated signal is generated when an image sensor having a primary color Bayer array is used, $Rg(t)=Rc(t)/Gc(t) \times G(t)$ as to an interpolated signal $Rg(t)$ of R acquired based upon a G signal. In this case, however, if noise of Ns is superimposed on each pixel signal, $Rg(t)=(Rc(t)+\alpha Ns)/(Gc(t)+\alpha Ns) \times (G(t)+Ns)$. However, the noise is a high-frequency AC component, as the noise component is reduced by passing a low-pass filter, $\alpha<1$, and if $t \to \infty$, $\alpha \approx 1$. Therefore, $Rg(t)=Rc(t)/Gc(t) \times (G(t)+Ns)$, that is, as to the noise component of the interpolated signal $Rg(t)$, $Rg(t)=Rc(t)/Gc(t) \times Ns$, and noise equivalent to $Rc(t)/Gc(t)$ is superimposed. Therefore, particularly if a value of $Rc(t)/Gc(t)$ is 1 or more, a problem that the noise component equal to or more than the proper noise amount is superimposed on the interpolated signal occurs.

In the meantime, in a conventional type signal processing method of removing noise, the reduction of a noise level is realized by reducing a high frequency zone. This process also reduces the gain of a high-frequency component of a required signal such as an edge component of an object and causes the deterioration of resolution.

As described above, the resolution enhancing process and the noise removing process respectively used heretofore have an opposite property and have a problem that they are difficult to be compatible.

Then, to solve the above-mentioned problems, in the present invention, it is set as an object to enhance the facility of an image signal processor and an image signal processing method by effectively reducing noise and enhancing resolution.

An image signal processor equivalent to a preferred embodiment of the present invention is provided with an image signal frequency zone limiter for limiting a frequency zone of an input pixel signal, an image signal frequency zone enhancer for enhancing the frequency zone of the input pixel signal, an edge character detector for detecting a character of an edge of the input pixel signal and a gain controller for controlling output pixel signals from the image signal frequency zone limiter and the image signal frequency zone enhancer according to output of the edge character detector and outputting them.

In a desirable example, the image signal frequency zone limiter is formed by a low-pass filter and the image signal frequency zone enhancer is formed by a high-pass filter.

Preferably, the edge character detector detects a differential value between a target pixel and its peripheral pixel. In addition, the edge character detector detects absolute values of signal levels of a target pixel and its peripheral pixel.

According to the present invention, the facility of the image signal processor and the image signal processing method can be enhanced.

BRIEF DESCRIPTION OF THE DRAWINGS

FIG. 7 show an example of extrapolated interpolation in the processing of an image signal.

DETAILED DESCRIPTION OF THE PREFERRED EMBODIMENTS

Figure 1:
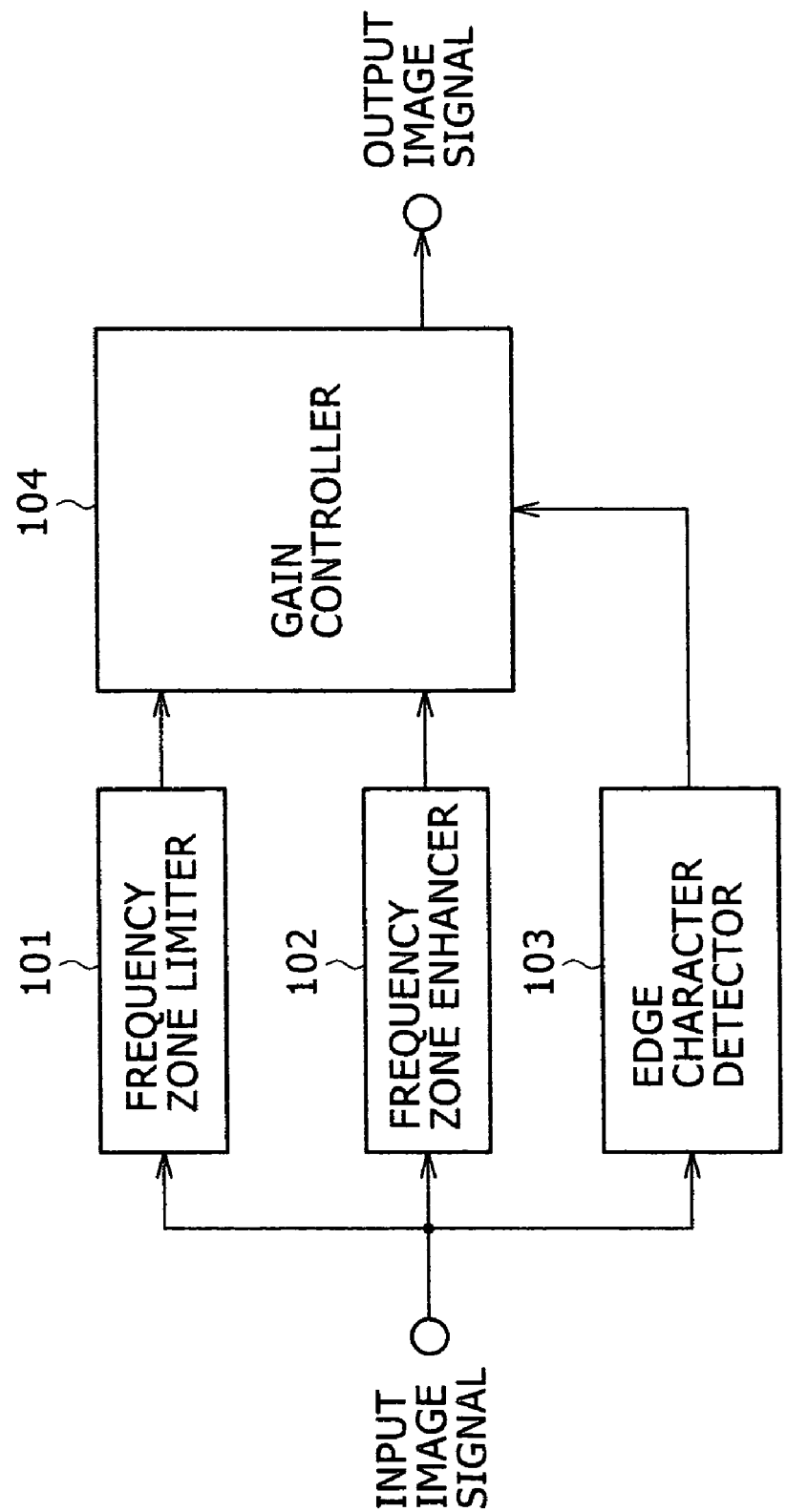
FIG. 1 is a schematic diagram showing an image signal processor equivalent to a best embodiment 1 of the present invention.

Referring to the drawings, preferred embodiments will be described below.

FIG. 1 is a schematic diagram showing an image signal processor in a best embodiment 1 of the present invention.

A frequency zone limiter 101 removes a noise component from an input image signal. For example, it is formed by a low-pass filter or a median filter.

A frequency zone enhancer 102 applies a resolution enhancing process to the input image signal, detects an edge of an object by adding overshoot and undershoot for example to the input image signal and compensates the input image signal. For example, the frequency zone enhancer is a part for generating an interpolated signal so that a frequency zone is extended when the interpolated signal is generated.

An edge character detector 103 detects a character of an edge of the object in the corresponding region based upon differential value information between a specific pixel and its peripheral pixel respectively in the input image signal or an absolute value of each signal level. For example, if a differential value between the specific pixel and its peripheral pixel is large, the edge character detector detects that the specific pixel is a shape (the edge) of the object. Conversely, if the differential value is small, the edge character detector detects that the specific pixel is in a background such as the sky the luminance level of which is flat. As another example, the edge character detector detects a direction of the shape (the edge) of the object by comparing differential values with pixels in a vertical, horizontal or diagonal directions of a central pixel. As yet another example, the edge character detector detects a flat part such as the skin of a human and the sky based upon an absolute value of a luminance signal level and the hue information of a chrominance signal in addition to a differential value.

A gain controller 104 changes the ratio in intensity of each output of the frequency zone limiter 101 and the frequency zone enhancer 102 according to output from the edge character detector 103 and executes an adding process.

According to the above-mentioned embodiment, a noise component can be effectively removed by more enhancing the effect of the frequency zone limiter 101 and reducing the effect of the frequency zone enhancer 102 according to the output of the edge character detector 103 in an image region in which the noise component is conspicuous and a resolution enhancing process is not required. Resolution can be effectively enhanced by reducing the effect of the frequency zone limiter 101 and enhancing the effect of the frequency zone enhancer 102 in an image region in which many edge components of an object are included and noise is not conspicuous.

Figure 2:
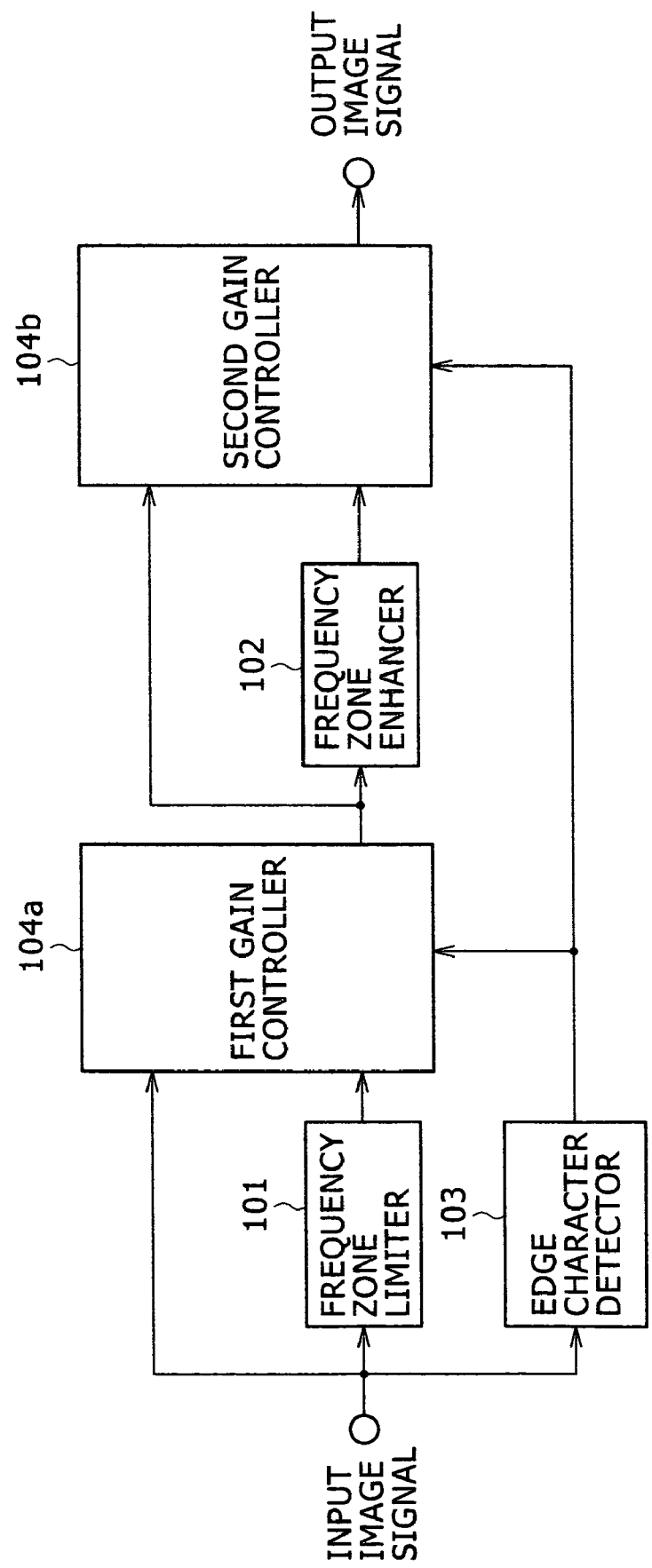
FIG. 2 is a schematic diagram showing an image signal processor equivalent to a best embodiment 2 of the present invention.

FIG. 2 is a schematic diagram showing an image signal processor equivalent to a best embodiment 2 of the present invention.

If a frequency zone limiter 101 and a frequency zone enhancer 102 are connected in series as shown in FIG. 2, the reduction of noise and a resolution enhancing process can also be effectively executed. For the difference in effect between the configuration shown in FIG. 1 and the configuration shown in FIG. 2, the following are conceivable. That is, in the configuration shown in FIG. 1, processing speed is faster, compared with that in the configuration shown in FIG. 2. In the meantime, in the configuration shown in FIG. 2, mounting is easier, compared with that in the configuration shown in FIG. 1. It need scarcely be said that the effect of the present invention is also acquired by changing the order of the frequency zone limiter 101 and the frequency zone enhancer 102 or applying only either.

It is needless to say that each unit configuring the image signal processor according to the present invention can be realized by circuit configuration or processing in software.

Figure 3:
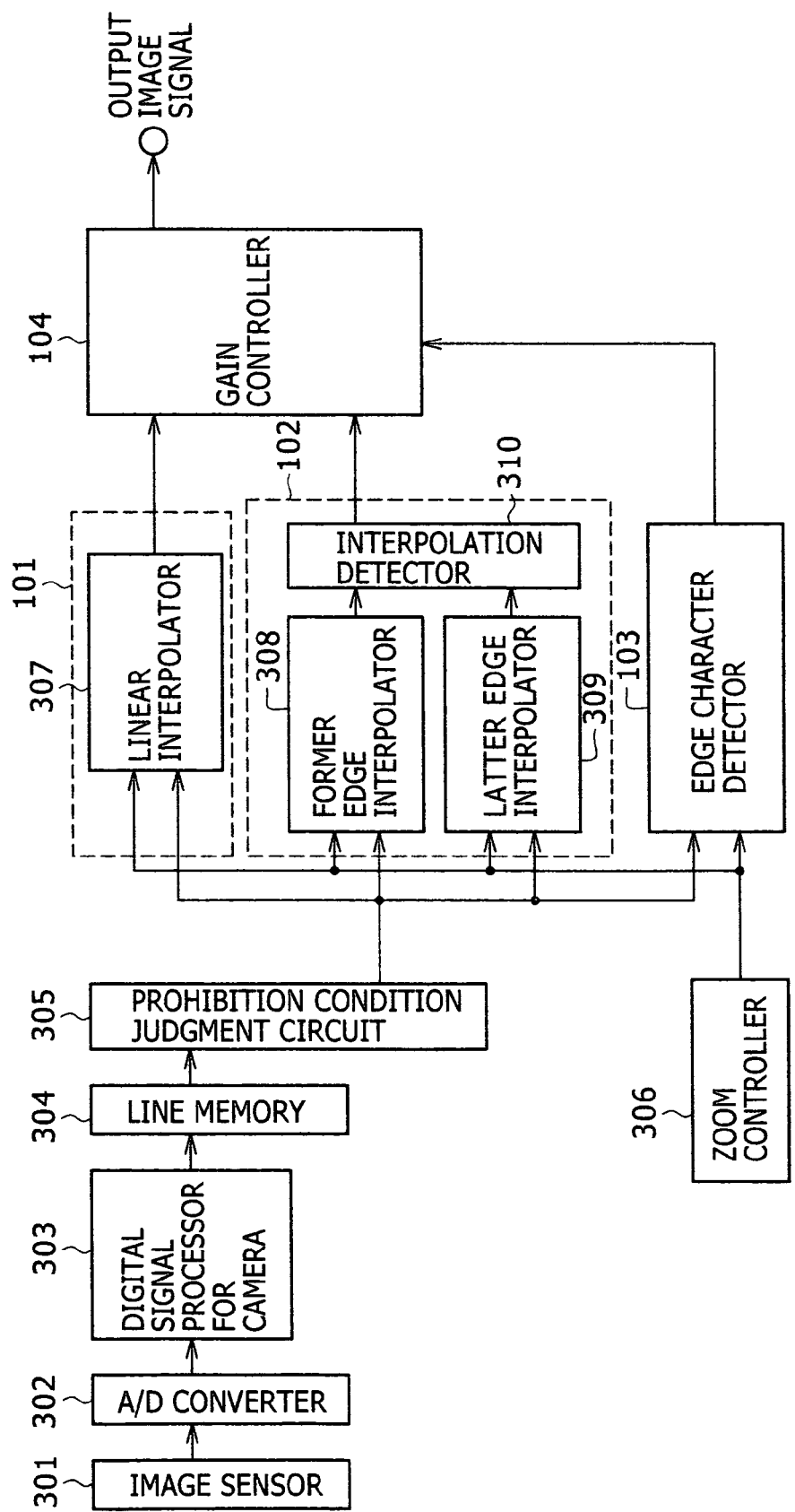
FIG. 3 shows an image signal processor equivalent to a first embodiment of the present invention.

FIG. 3 shows an embodiment in which the present invention is applied to a pixel interpolator in an imaging device.

The image sensor 301 for receiving light from an object and converting it to an electric signal outputs a pixel signal every pixel sequentially in a horizontal direction. The pixel signal is converted to digital data by an A/D converter 302. A digital signal processor for a camera 303 generates a YCrCb signal or an RGB signal based upon the digitalized pixel signal. A line memory 304 stores YCrCb signals or RGB signals output sequentially in the horizontal direction for pixels on plural lines as one line of which one horizontal scanning period is set. A prohibition condition judgment circuit 305, a linear interpolator 307, a former edge interpolator 308, a latter edge interpolator 309 and an interpolation detector 310 have the similar circuit configuration to those described in the Patent Reference 1.

That is, a pixel signal generated by the former edge interpolator 308, the latter edge interpolator 309 and the interpolation detector 310 in this embodiment is equivalent to a pixel signal generated by the above-mentioned frequency zone enhancer 102.

A pixel signal generated by the linear interpolator 307 in this embodiment is equivalent to a pixel signal generated by the above-mentioned frequency zone limiter 101.

An edge character detector 103 detects differential value information between a specific pixel and its peripheral pixel based upon an input image signal or a character of an edge of an object in the corresponding region based upon an absolute value of a signal level. A gain controller 104 changes the specific gravity of output results of the interpolation detector 310 and the linear interpolator 307 according to output from the edge character detector 103 and executes an adding process.

According to the above-mentioned configuration, when an interpolated signal is generated, an interpolated signal in which linear interpolation is enhanced and noise amplification is inhibited can be generated in an image region in which only a few edge components of an object are included and noise is conspicuous. In the meantime, in an image region in which many edge components of the object are included and noise is not conspicuous, an interpolated signal in which extrapolated interpolation is enhanced and resolution is enhanced can be generated.

This embodiment can provide the image signal processor based upon a pixel interpolation system for inputting a digital image signal and generating an interpolated signal, including the first interpolator that acquires an extrapolated point from original data for interpolation before generated interpolated data and acquires the interpolated data, the second interpolator that acquires an extrapolated point from original data for interpolation after generated interpolated data and acquires the interpolated data, the third interpolator that outputs the interpolated data using interpolated data before and after the generated interpolated data, wherein the third interpolator detects a slope of the original data for interpolation, determines whether a series of the signal is convex upward or convex downward, selects smaller one of output of the first interpolator and output of the second interpolator when a series of the original data for interpolation is convex upward, and outputs larger one of the output of the first interpolator and the output of the second interpolator as an extrapolated interpolated signal when a series of the original data for interpolation is convex downward, the edge character detector that detects a character of an edge of an object and the gain controller that changes the ratio in intensity of an output pixel signal from an extrapolated interpolated signal generator and an output pixel signal from the third interpolator according to an output result of the edge character detector and executes an adding process.

When this embodiment is applied to an imaging device, the imaging device can be acquired which includes the image sensor that receives light from an object and converts it to an electric signal, the A/D converter that converts a pixel signal output from the image sensor to digital data, the digital signal processor for camera that generates a luminance signal and a color-difference signal based upon the digitalized pixel signal and the line memory that stores pixel signals on plural lines as one line of which a horizontal scanning direction is set and characterized in that the imaging device executes a zoom process according to the above-mentioned interpolated signal generating method.

Figure 4:
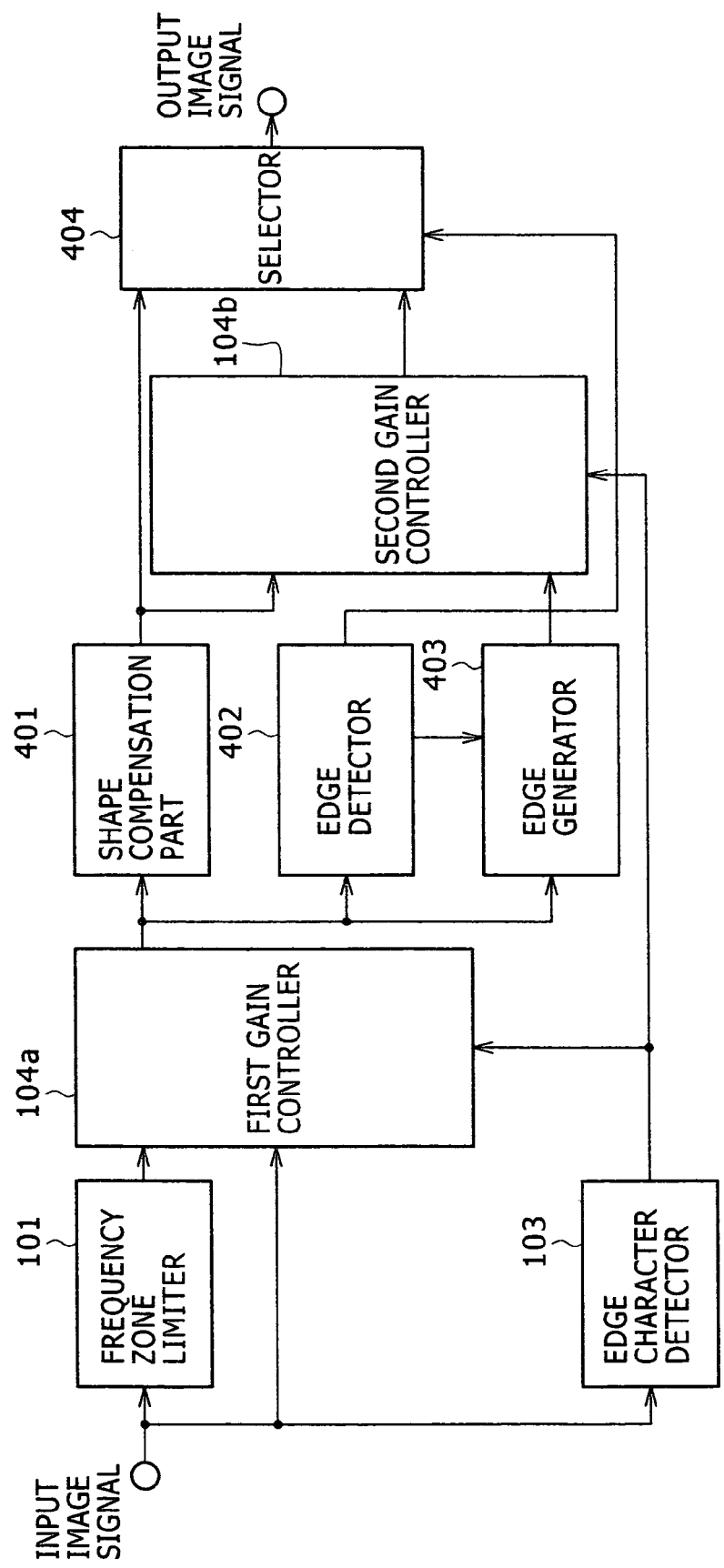
FIG. 4 is a schematic diagram showing an image signal processor equivalent to a second embodiment of the present invention.

FIG. 4 shows an embodiment in which the present invention is applied to an image signal processor that compensates a shape of an object.

A frequency zone limiter 101 and an edge character detector 103 are provided with the similar function to the function of above-mentioned those.

A first gain controller 104a changes the specific gravity of the frequency zone limiter 101 and an input pixel signal according to output from the edge character detector 103 and executes an adding process. A shape compensation part 401, an edge detector 402 and an edge generator 403 have the similar circuit configuration to those described in the Patent Reference 3. A second gain controller 104b changes the specific gravity of output results of the shape compensation part 401 and the edge generator 403 according to output from the edge character detector 103 and executes an adding process.

That is, a pixel signal generated by the edge detector 402 and the edge generator 403 in this embodiment is equivalent to a pixel signal generated by the above-mentioned frequency zone enhancer 102.

According to the above-mentioned configuration, in an image region in which only a few edge components of an object are included and noise is conspicuous, the frequency zone limiter is enhanced and a signal in which the amplification of noise is inhibited can be generated. In an image region in which many edge components of the object are included and noise is not conspicuous, the shape compensation part is enhanced and resolution can be enhanced.

This embodiment provides the image signal processor based upon an image signal processor for inputting a digital image signal and compensating a shape of an object and provided with a first shape compensation part that compensates a shape of the input digital image signal, the edge detector that detects an edge of the input digital image signal, a second shape compensation part that compensates the shape of the input digital image signal based upon the result detected by the edge detector, the edge character detector that detects a character of an edge of the object and the gain controller that changes the ratio in intensity of an output pixel signal from the first shape compensation part and an output pixel signal from the second shape compensation part according to an output result of the edge character detector and executes an adding process.

Figure 5:
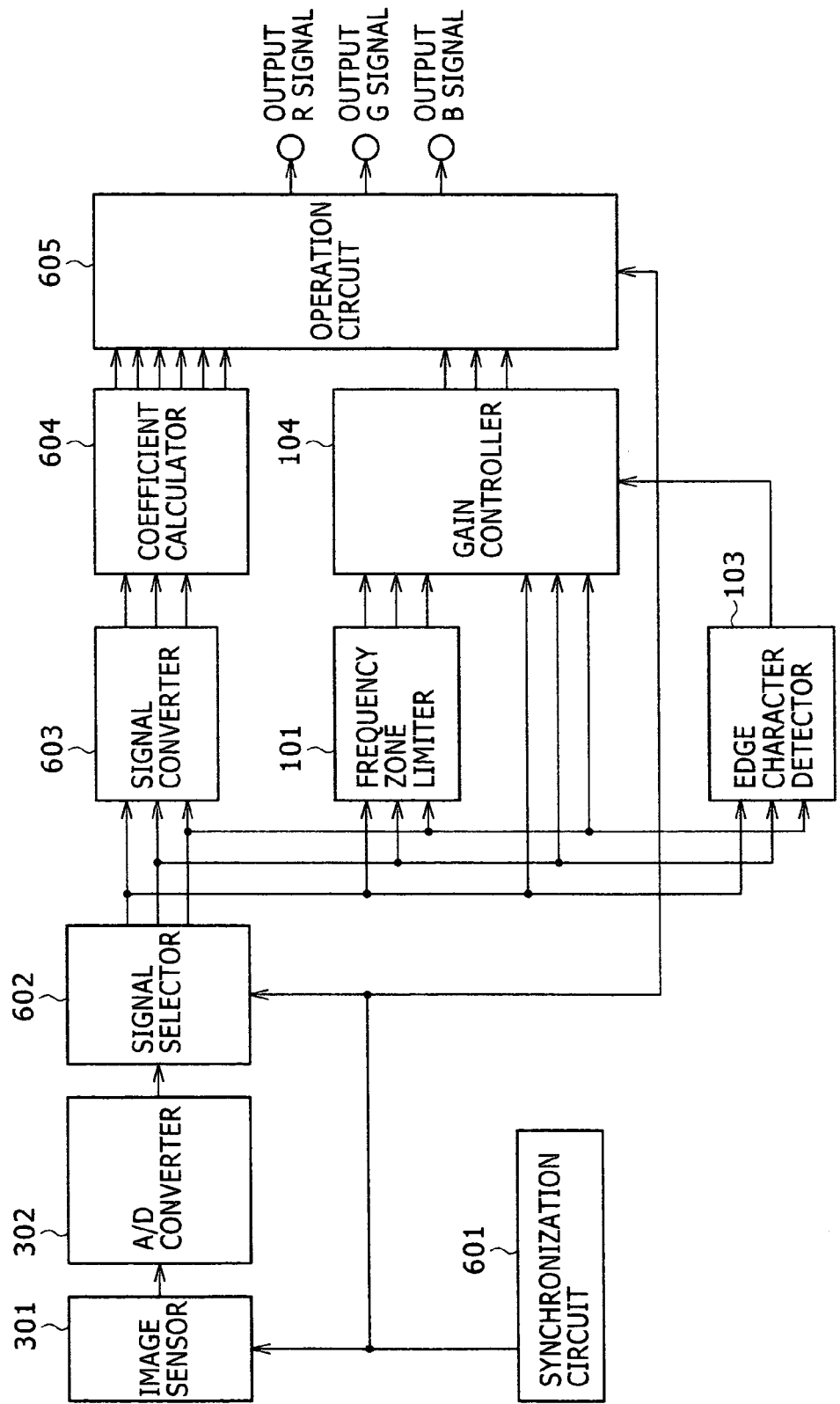
FIG. 5 is a schematic diagram showing an image signal processor equivalent to a third embodiment of the present invention.

FIG. 5 shows an embodiment in which the present invention is applied to a signal interpolation system described in the Patent Reference 2 where no false chrominance signal is caused even at an edge of an object.

The description of an image sensor 301 and an A/D converter 203 is omitted.

A synchronization circuit 601, a signal selector 602, a signal converter 603, a coefficient calculator 604 and an operation circuit 605 have the similar circuit configuration to those described in the Patent Reference 2.

A frequency zone limiter 101 and an edge character detector 103 are provided with the similar function to above-mentioned those.

A gain controller 104 changes the specific gravity of the frequency zone limiter 101 and a pixel signal after sampling according to output from the edge character detector 103 and executes an adding process. In this interpolation process, the larger the difference between a zone passing a low-pass filter and a frequency zone of one pixel (an instantaneous value) is, the higher-frequency interpolated signal can be generated. That is, the amplification of a high-frequency noise component can be prevented by lowering the frequency zone of one pixel (the instantaneous value). According to the above-mentioned configuration, when an interpolated signal is generated, the frequency zone limiter is enhanced and the interpolated signal in which the amplification of noise is inhibited can be generated in an image region where only a few edge components of an object are included and noise is conspicuous. In the meantime, in an image region where many edge components of the object are included and noise is not conspicuous, an interpolated signal the resolution of which is enhanced can be generated.

It is needless to say that this embodiment can be applied to not only an image sensor having a primary color Bayer array but an image sensor having a complementary color array (Mg: magenta, Gr: green, Cy: cyan, Ye: yellow).

This embodiment provides the signal interpolation system based upon an imaging device provided with the image sensor where plural color filters are arrayed for receiving light from an object and converting it to an electric signal and the A/D converter that converts a pixel signal output from the image sensor to digital data and provided with the first signal selector for extracting from the signal source a first signal string of the same type as a first signal extracted by selecting an arbitrary pixel signal out of pixel signals acquired by the plural color filters, the second signal selector for extracting from the signal source a second signal string different in a type from the first signal string, first and second waveform shapers for shaping the waveforms of output signals of the first and second signal selectors, the coefficient calculator for calculating a coefficient of the output signal of the second waveform shaper to the output signal of the first waveform shaper, the frequency zone limiter for limiting frequency zones of the output signals of the first and second signal selectors, the edge character detector for detecting a character of an edge of the object, the gain controller for changing the ratio in intensity of an output pixel signal from the output signals of the first and second signal selectors and a digitalized pixel signal from the image sensor and executes an adding process according to an output result of the edge character detector, the operation circuit for executing operation between an output signal from the coefficient calculator and an output signal from the gain controller and the interpolator for interpolating the signal output from the operation circuit in the signal output from the second signal selector.

Figure 6:
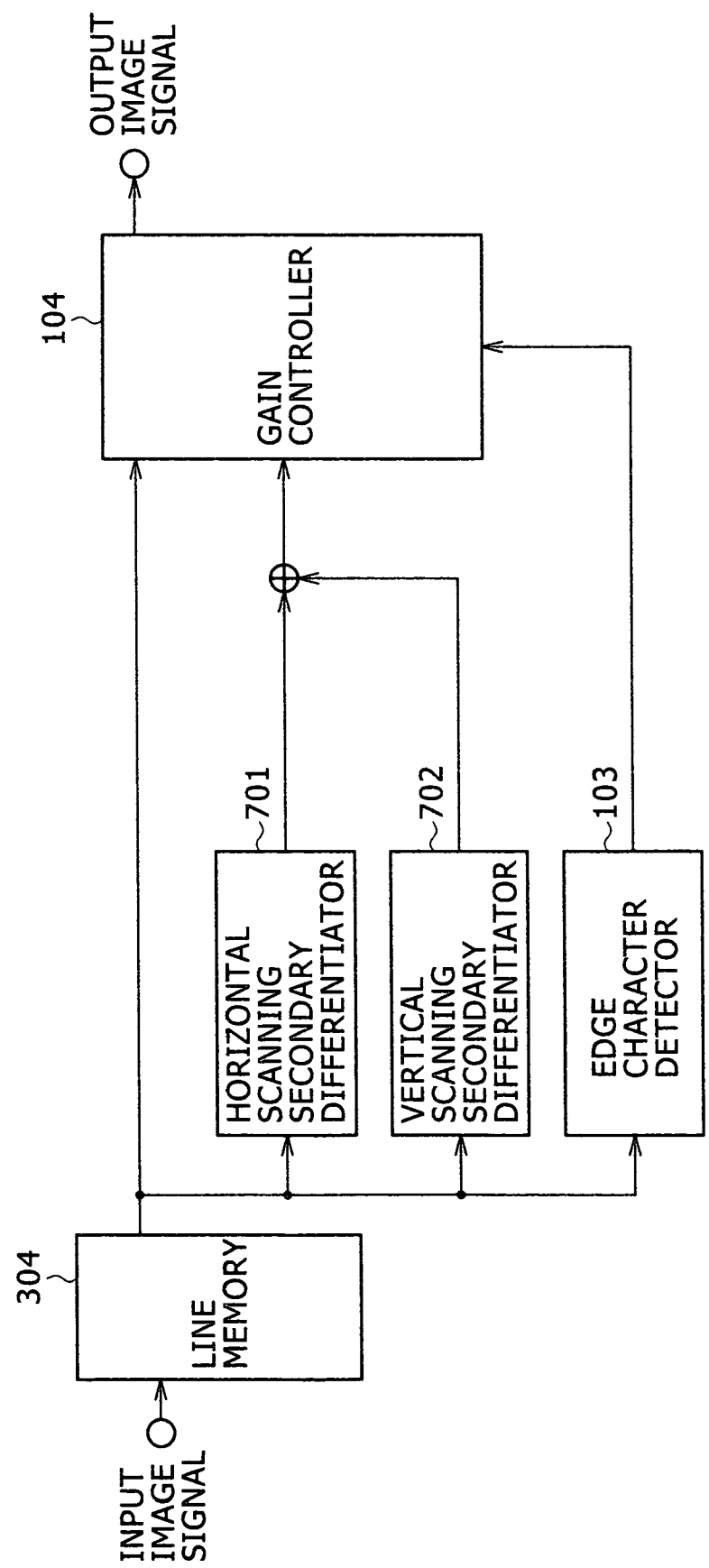
FIG. 6 is a schematic diagram showing an image signal processor equivalent to a fourth embodiment of the present invention.
Figure 7A:
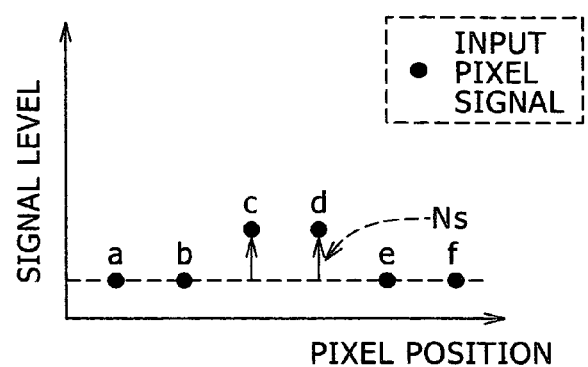
FIG. 7A shows input pixel signals.
Figure 7B:
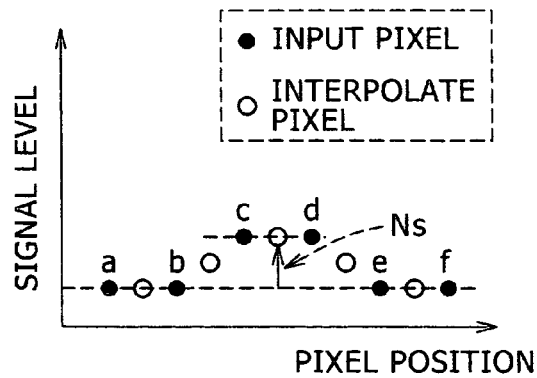
FIG. 7B shows linear interpolation.
Figure 7C:
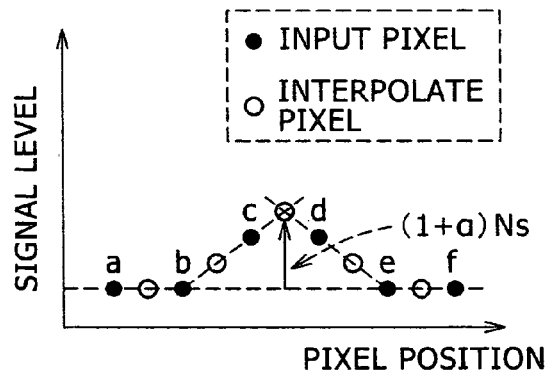
FIG. 7C shows extrapolated interpolation.

FIG. 6 shows an embodiment in which the present invention is applied to an image signal processor for enhancing resolution by adding overshoot and undershoot to an input image signal.

A line memory 304 stores YCrCb signals or RGB signals respectively sequentially output in a horizontal direction or pixel signals from an image sensor on plural lines as one line of which one horizontal scanning period is set. A horizontal scanning secondary differentiator 701 is a filter for extracting an edge component by applying secondary differentiation to a pixel in the horizontal direction, a vertical scanning secondary differentiator 702 is a filter for extracting an edge component by applying secondary differentiation to a pixel in a vertical direction, overshoot and undershoot are generated in the vicinity of an edge of an object by adding each input pixel signal, and the resolution is enhanced.

An edge character detector 103 detects a character of the edge of the object in the corresponding region based upon differential value information between a specific pixel and its peripheral pixel in an input image signal or absolute values of signal levels. A gain controller 104 changes the specific gravity of the added outputs of the horizontal scanning secondary differentiator 701 and the vertical scanning secondary differentiator 702 and an input pixel signal according to output from the edge character detector 103 and executes an adding process.

According to the above-mentioned configuration, when an interpolated signal is generated, a signal in which the addition of overshoot and undershoot is reduced and the amplification of noise is inhibited can be generated in an image region where only a few edge components of the object are included and noise is conspicuous. In the meantime, in an image region where many edge components of the object are included and noise is not conspicuous, the addition of overshoot and undershoot is enhanced and resolution can be enhanced.

This embodiment provides the image signal processor based upon an image signal processor for inputting a digital image signal and generating a shape compensated signal and provided with the line memory that stores pixel signals on plural lines as one line of which a horizontal scanning direction is set, the horizontal scanning secondary differentiator that generates a signal secondarily differentiated in the horizontal scanning direction based upon an image signal output from the line memory, the vertical scanning secondary differentiator that generates a signal secondarily differentiated in a vertical scanning direction based upon the image signal output from the line memory, the edge character detector that detects a character of an edge of an object and the gain controller that changes the ratio in intensity of a pixel signal output from the horizontal scanning secondary differentiator, an image signal output from the vertical scanning secondary differentiator and an input digital image signal according to an output result of the edge character detector and executes an adding process.

According to the above-mentioned configurations, first, the noise removing process in a region in which only a few edge components of an object in an image are included and noise is conspicuous can be enhanced and the unnecessary resolution enhancing process can be reduced. Second, the noise removing process in a region in which many objects are included in an image and noise components are not conspicuous can be reduced and the resolution enhancing process can be enhanced.

The image signal processor or an image signal processing program that generates an image the removal of noise of which and the resolution enhancing process of which are effectively executed by the first and second configurations can be provided.

What is claimed is:

1. An image signal processor, comprising:
   an image signal frequency zone limiter that limits a frequency zone of an input image signal;
   an image signal frequency zone enhancer that enhances a frequency zone of an input image signal;
   an edge character detector that detects an edge of a character of an input image signal; and
   a gain controller that controls and outputs output pixel signals from the image signal frequency zone limiter and the image signal frequency zone enhancer according to the output of the edge character detector;
   wherein the gain controller changes a ratio in intensity of output image signals from the image signal frequency zone limiter and the image signal frequency zone enhancer according to an output result of the edge character detector and executes an adding process.

2. The image signal processor according to claim 1, wherein:
   the gain controller is provided with:
   a first gain controller that changes the ratio in intensity of an output image signal of the image signal frequency zone limiter and an input image signal according to an output result of the edge character detector and executes an adding process; and
   a second gain controller that changes the ratio in intensity of an output image signal from the image signal frequency zone enhancer and an output image signal from the first gain controller according to an output result of the edge character detector and executes an adding process.

3. The image signal processor according to claim 1, wherein:
   the image signal frequency zone limiter is configured by a low-pass filter; and
   the image signal frequency zone enhancer is realized by adding an output signal from a high-pass filter to an input image signal.

4. The image signal processor according to claim 1, wherein:
   the edge character detector detects a differential value between a target pixel and its peripheral pixel.

5. The image signal processor according to claim 1, wherein:
   the edge character detector detects absolute values of signal levels of a target pixel and its peripheral pixel.

6. The image signal processor according to claim 2, wherein:
   the frequency zone enhancer includes:
   a first shape compensation part that compensates a shape of an input digital image signal;
   an edge detector that detects an edge of the input digital image signal; and
   an edge generator that compensates the edge of the input digital image signal based upon a result detected by the edge detector.

* * * * *

UNITED STATES PATENT AND TRADEMARK OFFICE
CERTIFICATE OF CORRECTION

PATENT NO. : 7,668,391 B2
APPLICATION NO. : 11/367389
DATED : February 23, 2010
INVENTOR(S) : Nonaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this

Twenty-eighth Day of December, 2010

David J. Kappos
*Director of the United States Patent and Trademark Office*